United States Patent Office 2,743,945
Patented May 1, 1956

2,743,945

HEAT EXCHANGER SEALING DEVICES

Max Bentele, Charles Stewart Lowthian, and William Allan Russell, Newcastle-upon-Tyne, England, assignors to C. A. Parsons & Company Limited, Newcastle-upon-Tyne, England Application November 15, 1952, Serial No. 320,796

Claims priority, application Great Britain November 16, 1951

5 Claims. (Cl. 285—1)

This invention relates to heat exchanger sealing devices and more particularly to pressure compensated sliding seals for rotary regenerative heat exchangers, especially those used as air preheaters for combustion turbines.

The efficiency of gas or other combustion turbines can be substantially increased by the application of heat exchangers. For prime movers which are restricted in space, rotary regenerators are preferable as regards efficiency and size.

The major problem of this type is the sealings separating the high pressure from low pressure sides. A minimum leakage is obtained by contact seals which rub against the regenerator rotor, but it is accompanied by wear of the seals or the rotor components or both. The function and life of the sealing arrangement depend upon the rate of wear, which has to be kept to a minimum. With the intention of achieving this, suitable materials, smooth surfaces and lubrication may be used.

A low contact pressure between the seals and rotor reduces the wear, prolongs the service life of the seals, and requires only a low driving torque.

In a drum type of regenerator the radial force on the seal can be compensated by subdividing the rear face of the seal, and connecting the divisions to the rubbing face by radial holes. Assuming that thereby the gas pressures on the rubbing face and the rear face of the seal are balanced, an additional force towards the drum is necessary for closing the seal on to the drum under operating conditions. The need for this additional force arises from the fact that due to differential thermal expansion, play in the bearings and machining tolerances, there is movement of the drum. Two cases arise: (a) movement of the drum away from the seal; (b) movement of the drum towards the seal. For this purpose springs are arranged which press the seal on to the drum by means of push rods.

Apart from the increase of the scantlings of the regenerator by this arrangement the load conditions on the seals are detrimental to a low value of torque and rate of wear. The spring force must be sufficient to overcome the maximum prevailing friction force, between the seal and its housing which occurs at the maximum pressure difference between the high pressure and low pressure side or approximately at full load of the gas turbine and when the drum is moving away from the seal. At lower outputs the pressure ratio of the turbine, and consequently the friction force, is smaller. The spring force is then excessive, giving a higher load than required for the adjustment of the seals and consequently a high rate of wear. This adverse effect is especially pronounced when the drum moves radially towards the seal and the friction acts in the same direction as the gas or like force.

A method has been suggested whereby a variable force is obtained, directly or indirectly controlled by the air pressure of the regenerator. This method, involving the application of flexible tubes, bellows, capsules, and the like, requires additional components, mainly accurately machined, and increases the size and complexity of the regenerator.

The object of the present invention is to provide an arrangement which avoids these disadvantages, and is mechanically simple, reliable, employing a contact pressure which is just high enough to keep the seal against the drum under all operating conditions, and is automatically adjusted to the prevailing air and gas pressure conditions in the regenerator.

Since the contact pressure, and consequently the torque, and the rate of wear, change with the load, and the total wear and life of the sealing depend on the total amount of work produced by the turbine plant, optimum values of leakage, torque, sealing, wear, and life therefore result.

The invention consists in a pressure compensated sliding seal for a rotary regenerative heat exchanger comprising a housing fixed to the outer casing, the housing having a recess facing the rotor in which a sliding seal is housed, the rear face of the seal being separated from the housing by a gap which is subdivided into several gas-tight compartments.

Referring to the accompanying drawings.

Figure 1:
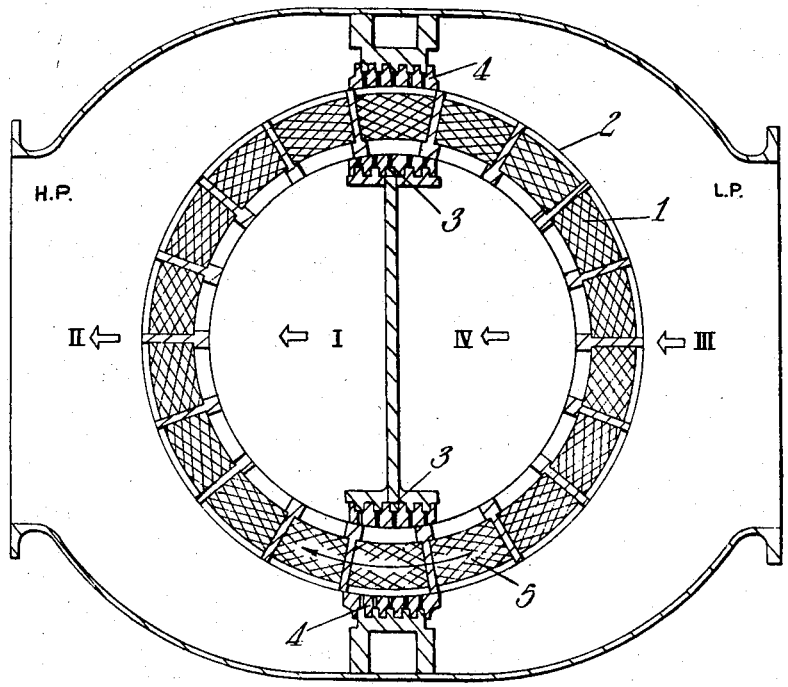
Figure 1 shows a cross-section of a rotary drum type regenerator as applied to a conventional open cycle gas turbine for purposes of illustrating the present invention.

Referring to Figure 1 cold high pressure air from the compressor enters at I, is heated in a matrix contained in chamber 1 of rotor 2 and leaves the regenerator at II. Hot low pressure gas from the turbine enters at III, is colled in the matrix, and leaves at IV. The high pressure and low pressure sides are separted along the cylindrical drum face inside by seals 3, and outside by seals 4. The drum rotates in a clockwise direction 5. The chambers contain on the high pressure side I—II, air of high pressure, and on the low pressure side III—IV, gas of low pressure. While traversing the seal from the high pressure side to the low pressure side, the air pressure inside a chamber decreases first slightly due to leakage and then suddenly due to direct connection of the chamber with low pressure side of the regenerator. During the change over from the low pressure side to the high pressure side the reverse effect occurs. The forces exerted by the air pressure on the seals change accordingly, and counterforces have to be applied in order to prevent lifting of the seal which would result in a high leakage flow.

Figure 2:
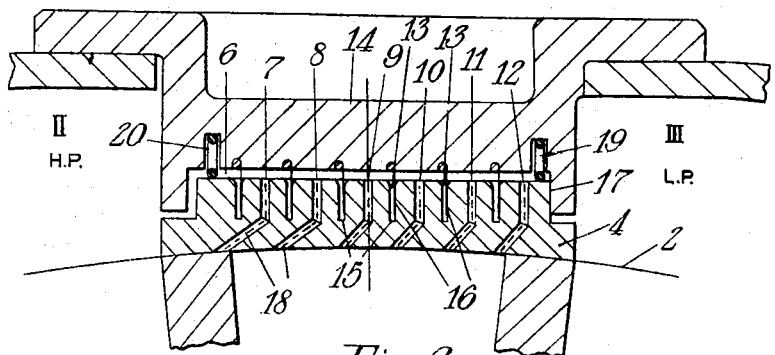
Figure 2 shows a cross-section of a seal and housing according to the best method of performing the invention known to the applicants.

Referring now to Figure 2, the rear face of the seal 4 is subdivided into seven compartments 6–12 which are separated by sealing strips 13 peened into a housing 14 and protruding into grooves 15 in the seal. At the axial ends of the seal sealing strips extend radially close to the drum face 2. The sealing strips are flexible and are initially bent so as to press against the low pressure sides 16 of grooves. This is increased by any pressure difference between the compartments 6–12, the higher pressure acting always on the free side of the strips. The flexibility of the strips also allows for differential thermal expansion between seal and housing. The seal is supported against the force due to difference in pressure between high pressure and low pressure sides on the low pressure end 17.

The seal is pressed against the drum by wave springs 19 and 20 which provide initial contact with the rotor and prevent when necessary its lifting by its own weight when the regenerator is shut down and when it is started up.

The compartment 6 is directly connected to the high pressure side. The compartments 7–12 are connected to the rubbing face of the seal by holes 18 which end at this face at points positioned in line with the high pressure end of the relevant compartment, or further to the high pressure side so that these compartments are provided with gas pressures equal to or higher than the gas pressure acting on the relevant section of the rubbing face opposite to them.

We claim:

1. A pressure compensated sliding seal between high and low pressure sides in a rotary regenerative heat exchanger comprising a housing fixed to an outer casing, a rotor, the housing having a recess facing the rotor, a sliding seal mounted in said recess and having an arcuate rotor engaging face and a rear face, the rear face of the seal being separated from the bottom of said recess by a gap, means subdividing said gap into a plurality of substantially gas-tight compartments each extending parallel to the axis of said rotor engaging face and said seal having separate passageways extending therethrough from each compartment and opening in said rotor engaging face.

2. A seal according to claim 1, in which the end of the said compartment adjacent the high pressure side communicates with the high pressure side through the said gap and the said passaeways open in the said rotor engaging face at points thereof positioned circumferentially closer to the high pressure side than corresponding ends of the respective said passageways which open from the said compartments.

3. A seal according to claim 1, in which the means subdividing said gap into a plurality of substantially gas-tight compartments comprises, for each compartment, a sealing strip fixed to the bottom of the said recess and the said rear face of the sliding seal has a corresponding plurality of grooves receiving the said strips.

4. A seal according to claim 3, in which the said strips are flexible and arranged so as to press against the low pressure sides of the said grooves.

5. A seal according to claim 1, comprising also wave springs maintaining the seal in contact with the rotor surface.

References Cited in the file of this patent

UNITED STATES PATENTS

| 1,689,735 | Losel | Oct. 30, 1928 |
| 1,925,898 | Fritz | Sept. 5, 1933 |
| 2,643,097 | Bowden | June 23, 1953 |

FOREIGN PATENTS

| 543,093 | Great Britain | Feb. 10, 1942 |